Dec. 13, 1955   P. D. R. DORITY   2,727,127
ELECTRODE HOLDER
Filed Aug. 6, 1952
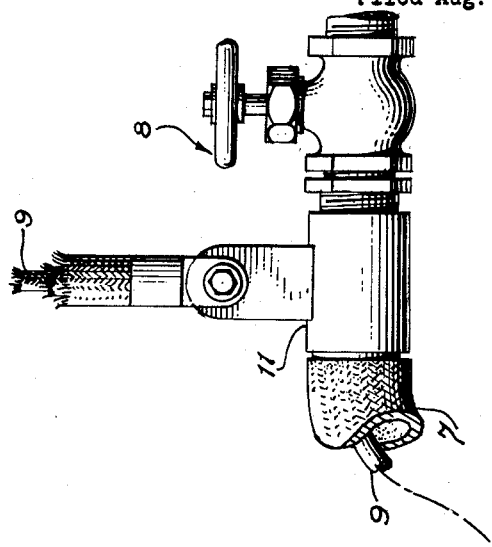
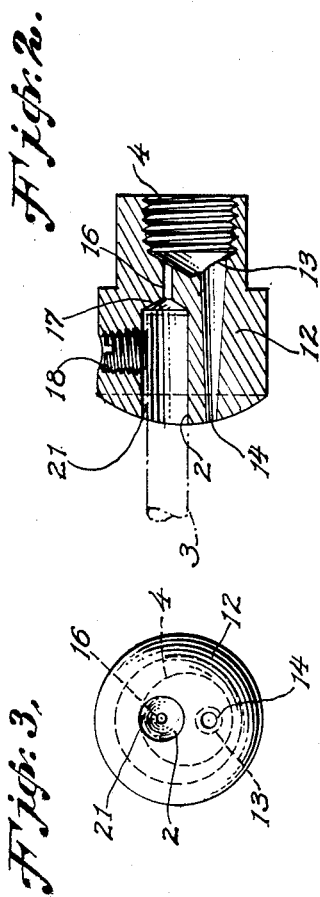
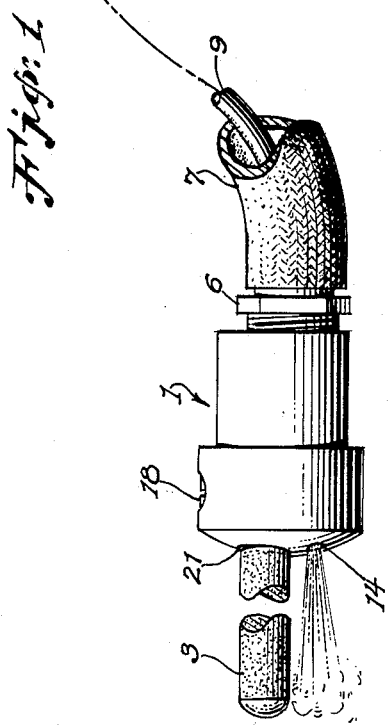
INVENTOR
PAUL D. R. DORITY
BY
ATTORNEYS.

United States Patent Office 2,727,127
Patented Dec. 13, 1955

2,727,127

ELECTRODE HOLDER

Paul D. R. Dority, Bremerton, Wash.

Application August 6, 1952, Serial No. 303,014

3 Claims. (Cl. 219—15)

(Granted under Title 35, U. S. Code (1952), sec. 266)

This invention relates to cutting tools and, more specifically, to apparatus for holding or supporting arc electrodes, such as are used in the burning or cutting of metal rivets, pads, tack-wells, clips, welded seams and other similar operations.

This invention may be manufactured and used by or for the Government of the United States of America for governmental purposes without the payment of any royalties thereon or therefor.

The tool most commonly used for work of this nature is the carbon arc electrode burner which is formed of a holder that supports the electrode, the electrode usually being consumed, or used up, as it is applied. However, even though such tools are in almost universal use, they do have several real disadvantages such, for instance, as the fact that most of them are excessively cumbersome, unwieldy and quite difficult and troublesome to use in that frequently their structural composition renders them almost impossible for use in crowded work areas. In addition to these objectionable structural features, the present-day tools are unnecessarily inefficient from an operative standpoint in that, as far as is known, no provision has been made for removing the molten metal as it is burned away in the cutting operation, so that this metal soon hardens and presents rough and ragged edges that frequently must be cleaned or smoothed down. Further, the use of the existing tools has been found to produce an excessive amount of scale, particularly when the burn is performed in the presence of an oxidizing atmosphere; and such scale also must be cleaned before the operation can be considered finished.

Another difficulty that apparently has not been overcome lies in the particular manner in which the electrodes have been mounted, many of these mountings being so designed that a relatively large portion of the electrode is grasped and, therefore, cannot be utilized for the burning. When such is the case, full utilization of the available portion of the electrodes still leaves a relatively large butt-end portion which then normally must be discarded. In other holders, the electrode is inserted into a socket and, when its free extent has been consumed, the butt portion remains in the socket and must be pried out by a special tool with a considerable loss of time and effort.

It is, therefore, an object of the present invention to provide a holder which is small, light and easily manipulatable in confined working areas, and, in addition, a holder which avoids any necessity for clean-up operations after the cut is made.

A related object is to provide such a holder with means for removing the molten metal from the particular spot being cut as the cut is being made.

A further object is to provide an electrode holder which permits a maximum amount of the electrode to be utilized and which is provided with means for ejecting the remaining butt end of the electrode after its free extent has been utilized.

Still another object is to provide a means for cooling the electrode as it is being used.

These objects, as well as other objects which will become apparent, are achieved fundamentally by directing a fluid, such as air, through the holder and onto the work, the holder being formed to support its cutter member, which may be a carbon arc electrode, in a longitudinally-disposed position so that the free end of the electrode may be brought into adjacency or contact with the work. The electrode being supported in this manner, the holder is provided with an air-passageway adapted to project the air supply outwardly along and in close proximity to the longitudinal free extent of the electrode; the air being thus projected then impinging on the work in the immediate vicinity of the electrode end to blow away the molten burned metal as the cutting work is being performed. Preferably, the air passageway is extended transversely from one side of the holder through to the other, and it is formed with a gradually converging taper adapted to concentrate the jet on the molten metal to be removed.

Another feature of the invention lies in the manner in which the electrode is secured in and subsequently removed from the holder after its unsecured free extent has been used up. Most suitably, the holder is provided with a socket adapted to receive only such an electrode length as is required to permit this length to be clamped and secured in a supported position, the securement being provided by a small retractable screw, or other suitable means. When the electrode is completely consumed, its butt end remains in the socket, but the removal of this end is very effectively provided for by forming an opening or path to direct a portion of the air or fluid pressure against it. With such an arrangement the remaining end can be quickly blown out of the socket simply by loosening the set screw. Since the electrode is held in its position against the outward thrust of the air pressure, such a loosening permits the air pressure to readily eject the butt. A further refinement of this ejection arrangement is that the air pressure, constantly acting on the secured butt end of the electrode, also is used to cool the electrode. Such a cooling also is controlled by the provision of an attenuated path around the supported end of the electrode and such a path is formed by the pressure exerted by the securing means on the electrode. In other words, the securing means moves the electrode a slight distance which is sufficient to form this attenuated path through which the cooling air can flow.

The preferred embodiment of the invention is illustrated in the accompanying drawings in which Fig. 1 is a side view of the holder connected to mechanism for supplying the requisite electric current and fluid pressure; Fig. 2 a longitudinal vertical section through the holder, and Fig. 3 a front end view of the holder shown in Fig. 2.

The mechanism illustrated in the drawings includes a holder 1, formed of a solid casting preferably made of an electrically conductive metal, such as copper, the holder being provided at one of its sides with an inwardly extending socket 2 adapted in size to receive an end portion of a carbon arc electrode 3, which preferably is of a type that is consumed in use. The opposite side of holder 1 also is provided with socket 4 threaded interiorly to receive a coupling nut 6 on which is fixed a flexible air conduit 7 in which is mounted suitable valve mechanism 8 for controlling the air supply. Also, holder 1, being formed of a conductive material, is electrically connected to a current supply by means of an electric cable 9 which, for purposes of compactness, safety and protection, is enclosed within the sheath provided by flexible air conduit 7. As may be seen, cable 9 is led into the flexible air conduit through a T coupling 11 by means of which the apparatus also can be conveniently suspended in any desired location.

As has been indicated, an important feature of the present invention resides in the manner in which the air supply is utilized to blow away molten metal, as well as to eject unused butt ends and to cool the electrode during its application to the work.

To assure a removal of the molten metal, the holder is provided with a transverse passageway 12 having an inlet opening 13 communicating it with coupling socket 4 and an outlet opening 14 for discharging or propelling the inducted air outwardly along the supported electrode. It has been found most suitable to utilize an outlet opening of approximately ⅛" diameter and to provide passageway 12 with a taper that gradually converges toward this opening along an incline of approximately ⅝" per foot. Such a taper appears to be most desirable for use with standard electrodes, and, in fact, untapered or cylindrical passageways have been found far less successful regardless of the size of outlet opening 14. The purpose of the taper, of course, is to concentrate the air on a point which is in the immediate vicinity of the contact area of the electrode and any passageway which permits excessive divergence of the jetted air proportionately reduces the beneficial effects otherwise produced.

The cooling, as well as the butt-ejecting, functions of the air supply are utilized by conducting a portion of the supply through another passageway or opening 16 which also initiates in coupling socket 4 and opens into a concavely-shaped air pocket or chamber 17 formed along the innermost recess of socket 2. As may be appreciated, when the holder is being used, there is a constant air pressure acting on the interior end of the supported electrode, so that it is necessary to provide means for securing the electrode in place against this pressure. Such a means, in the present illustrated form, is provided by set screw 18, extending downwardly through the holder and having its bottom end adapted to bear against an inserted electrode. Most suitably, the length of socket 2 and the diameter of set screw 18 are kept to the minimum required for providing sufficient support for the electrode, so that all except a very small portion of the electrode end can be used. The ejection of the unused portion of the electrode is very quickly and easily accomplished with this arrangement simply by unloosening set screw 18 and permitting air pressure in socket 17 to blow out this unused portion.

The cooling effect on the electrode is also provided by the air flowing through conduit 16 into air pocket 17, although the efficiency effected by this cooling depends to a material extent upon distributing this air around the supported surfaces of the electrode. To permit the cooling air to reach the surfaces of the electrode, an attenuated path 21 is provided between the electrode and the wall of socket 2, such a path being formed because of the necessarily loose fit of the electrode in its socket. Of course, the socket is formed to receive an electrode of a particular diameter, but such a reception must permit some looseness and this looseness is taken advantage of by utilizing set screw 18 to press the electrode downwardly or toward the base portion of its socket, thereby forming around the upper arcuate surfaces of the electrode this so-called attenuated path 21. The air proceeding through conduit 16 then can flow rather freely through the attenuated path and outwardly onto the upper portions of electrode 3 to cool it. However, another important point to be considered in this regard is that the flow proceeds along the upper portions of the electrode or, in other words, along a portion of the electrode which is furthest from the jet of air emanating from passageway 12. The purpose of directing the cooling air in this manner is, as has been indicated, to avoid any interference between the cooling air and the metal removing blast, such an interference being most undesirable in that it would destroy the concentration of the blast and thereby destroy the efficiency of the metal removal. Of course, the directional control of the cooling air is achieved by so locating set screw 18 that it presses the electrode toward passageway 12 and thereby forms the attenuated path on a side of the holder which is diametrically opposite the side from which the blast emanates.

In operation, the mechanism described above is brought to the work simply by carrying holder 1 into appropriate proximity with it. Valve 8 then is open to permit flow of air through conduit 7 and the current necessary for producing the electrode arc is turned on. Preferably, an air pressure of approximately 90 pounds per square inch has been found sufficient for use with an electrode which measures up to 18" in length, and the dimensions previously given with respect to the taper of passageway 12 are found most effective when such an electrode and such an air pressure is used. Of course, any material variations in the electrode 3, or the air pressure, can be compensated for by variations in the size and taper of the passageway. The electrode is applied to the work and, as the work proceeds, the electrode is used up until all that remains is a butt end that is almost wholly encased or lodged in its supporting socket. However, the consumption of the electrode down to this very minimum presents no difficulty since this butt end can be blown out very easily in the manner described.

Other advantages of the present mechanism which should be apparent from the drawing lie in the provision of a small and compact unit which can be guided into relatively inaccessible work areas and easily manipulated in those areas. Such smallness is found advantageous since it permits the full use of the free, supported length of the electrodes at most any location, while other holders of which I am aware are so large that, at best, only the electrode can be inserted into the space to be worked. In this latter event, it will be recognized that the depth to which the electrode can be inserted limits the amount of electrode which can be used up. For these reasons, the size and arrangement of the elements of the present holder not only are advantageous in facilitating its use but also increase its efficiency by avoiding the necessity of discarding substantial lengths of unused electrodes.

Obviously many modifications and variations of the present invention are possible in the light of the above teachings. It is, therefore, to be understood that within the scope of the appended claims the invention may be practiced otherwise than as specifically described.

I claim:

1. An electrode holder comprising a body provided at one of its sides with a socket adapted to receive an end of and support said electrode in a longitudinally-disposed position, means securing said electrode in its supported position, and means for supplying fluid pressure to said holder, said holder being formed with a port communicating said socket with said fluid pressure and with a passageway for directing said supplied fluid pressure longitudinally along and in close proximity to the free extent of one side of said electrode, said electrode securing means being adapted when tightened to press said electrode toward said passageway and form an attenuated pass for conducting said fluid pressure into a cooling contact with said other side of the electrode, said securing means maintaining said electrode in its supported position against said socket pressure.

2. An electrode holder comprising a body provided at one of its sides with a socket adapted to receive an end of and support said electrode in a longitudinally-disposed position, means securing said electrode in its supported position, and means for supplying air under pressure to said holder, said holder being formed with a port communicating said socket with said air and with a passageway for directing said air pressure longitudinally along and in close proximity to the free extent of one side of said electrode, said electrode securing means being adapted when tightened to press said electrode toward said passageway and form an attenuated pass for conducting the air into a cooling contact with said other side of the electrode, and said passageway and port being of such dimensions as to admit pressure sufficient to blow away molten metal and to eject said electrode when said securing means are released, said passageway extending transversely through said body in substantial spaced axial alignment with said socket and further being provided with a gradual outwardly-converging taper adapted to concentrate its pressure on the free end of the electrode.

3. An electrode holder comprising a body provided at one of its sides with a socket adapted to receive an end of and support said electrode in a longitudinally-disposed position, means securing said electrode in its supported position, and means for supplying fluid pressure to said holder, said holder being formed with a port communicating said socket with said fluid pressure and with a passageway for directing said supplied fluid pressure longitudinally along and in close proximity to the free extent of one side of said electrode, said securing means maintaining said electrode in its supported position against said socket pressure, and said passageway being provided with a gradual outwardly-converging taper directed at the free tip of the electrode for concentrating its pressure on said tip.

References Cited in the file of this patent

UNITED STATES PATENTS

| | | |
|---|---|---|
| 1,037,979 | Perkins | Sept. 10, 1912 |
| 2,274,631 | Meredith | Feb. 24, 1942 |
| 2,371,945 | Barbeck | Mar. 20, 1945 |
| 2,376,265 | Meredith | May 15, 1945 |
| 2,433,018 | Ronay | Dec. 23, 1947 |
| 2,468,806 | Pilia | May 3, 1949 |
| 2,468,808 | Drake | May 3, 1949 |

FOREIGN PATENTS

| | | |
|---|---|---|
| 863,983 | France | Jan. 8, 1941 |